United States Patent [19]
Somer

[11] Patent Number: 4,740,996
[45] Date of Patent: Apr. 26, 1988

[54] TEMPERATURE INDEPENDENT, LOW LEVEL, AM MODEM RECEIVER

[75] Inventor: Gerald L. Somer, Sebastopol, Calif.

[73] Assignee: AMP Incorporated, Harrisburg, Pa.

[21] Appl. No.: 932,140

[22] Filed: Nov. 17, 1986

[51] Int. Cl.⁴ ............................................. H04B 1/16
[52] U.S. Cl. ....................................... 375/76; 375/98;
 455/246; 455/247; 455/253
[58] Field of Search ................... 342/91, 92; 330/278,
 330/279, 281; 375/76, 98; 455/234, 246, 247,
 253; 358/174, 175; 328/173, 175

[56] References Cited

U.S. PATENT DOCUMENTS

| | | | |
|---|---|---|---|
| 3,409,834 | 11/1968 | Cullis et al. | 455/247 |
| 3,733,553 | 5/1973 | Magnante et al. | 375/98 |
| 4,037,163 | 7/1977 | Nicholas | 375/98 |
| 4,165,493 | 8/1979 | Harrington | 455/246 |

Primary Examiner—Benedick V. Safourek
Attorney, Agent, or Firm—David L. Smith

[57] ABSTRACT

The receiver of a radio frequency modem (10) achieves temperature and component independence in two steps. The receiver accomplishes detection in unbalanced parallel paths (Q45, Q47; Q44, Q46) such that the diode drops of transistor base-to-emitter junctions in each path offsets those in the other path whereby temperature dependence of components does not adversely affect the operation of the receiver. Any residual base-to-emitter junction offset causes floating of the quiescent bias of the circuits. The floating is further removed by using the same ladder network (R119, R120, R121, R122, R136) to derive all references (60, 61, 62, 63), automatic gain control (63) as well as slicing levels (60, 61, 62). This minimizes the number of circuit components as compared, for example, to using balanced amplifiers. Detectors (Q45, R105, C89, Q47, R108; Q44, R106, C86, Q46, R107, C87) employed in the two unbalanced paths utilize two stages of detection rather than a single stage of detection so as to minimize distortion. Distortion is further minimized when the transistors of corresponding amplifiers in the two unbalanced paths are on the same substrate.

18 Claims, 5 Drawing Sheets

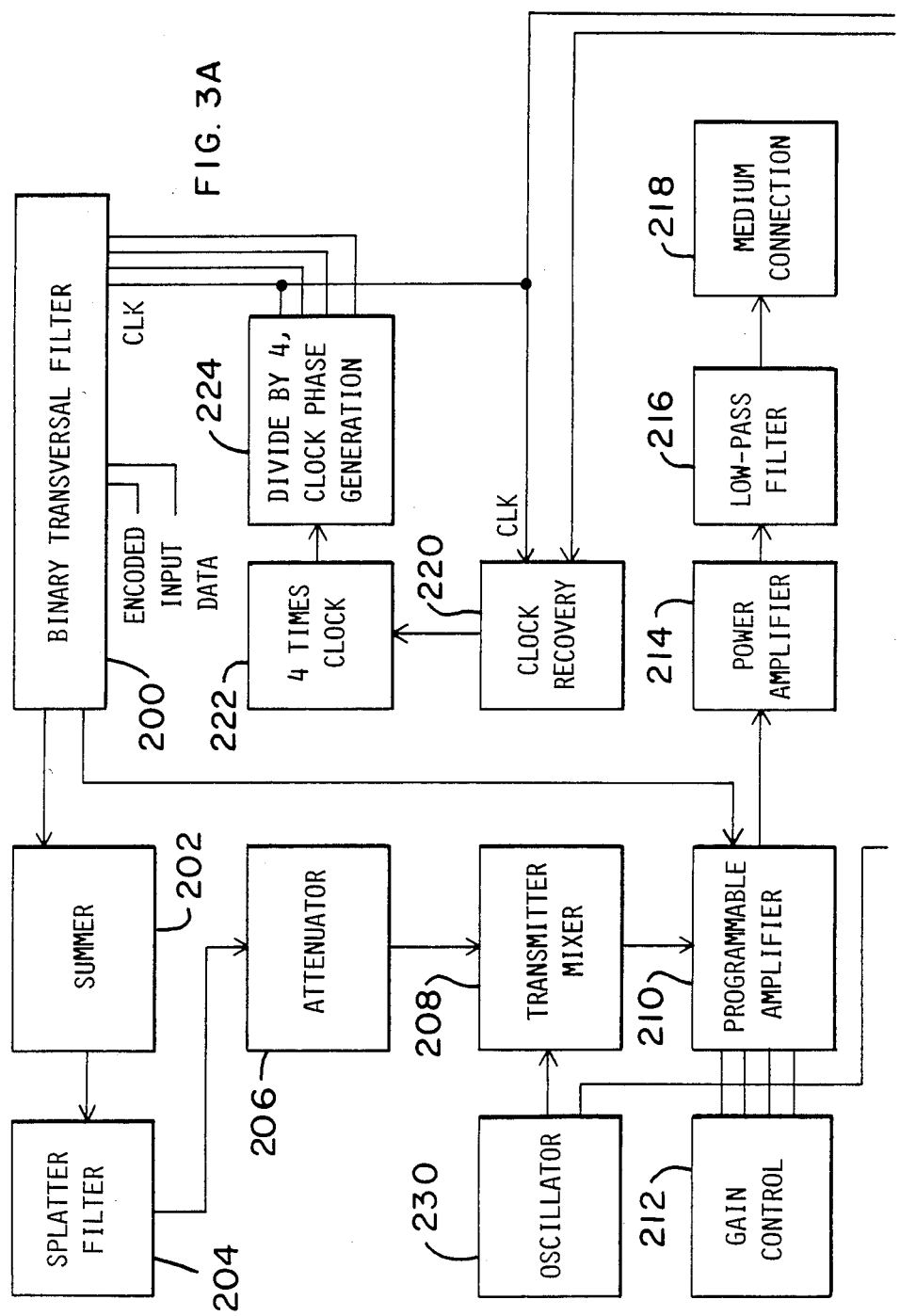

TEMPERATURE INDEPENDENT, LOW LEVEL, AM MODEM RECEIVER

The present invention is related to the following concurrently filed co-pending applications all of which have been assigned to the same assignee as the present application, each of which is incorporated herein by reference, and include Application Ser. No. 931,573, "RF Modem with Improved Clock Recovery Circuit", filed Nov. 17, 1986, by G. Somer;

Application Ser. No. 931,576, "RF Modem with Improved Binary Transversal Filter", filed Nov. 17, 1986, by G. Somer and P. Walp; and Application Ser. No. 931,765, "RF Modem with Oscillator Switching Circuit", filed Nov. 17, 1986, by G. Somer.

BACKGROUND OF THE INVENTION

This invention relates to radio frequency modulation and in particular to a radio frequency modem having a receiver in which the DC bias in two unbalanced signal paths cancel out.

A voltage reference for automatic gain control is often achieved by using a voltage divider network of resistors tied between a supply voltage and ground. The voltage reference for automatic gain control thus generated does not float and relies on both the regulation of the power supply and the bias stability of the receiver's amplifiers and detectors, to prevent drifting of the detected modulation due to external effects such as changes in the temperature of components.

The receiver described below is used to demodulate a duobinary waveform in which digital, or binary, data has been encoded into and are represented by several levels of an amplitude modulated (AM) carrier for purposes of radio frequency (RF) stability (i.e. preventing unwanted oscillations) and also low component count and thus cost, it is necessary to keep overall receiver gain low. This means that the detected envelope of the signal will be small, on the order of three to four hundred millivolts. A modem must accurately divide, or slice, the detected envelope, or video signal, into four levels which must be, for the purpose of maintaining low bit error rate precisely defined over a wide operating temperature range and with varying component tolerances.

A single silicon diode forward voltage drop, such as a transistor base-to-emitter junction, is typically approximately 0.7 volts at room temperature. A forward voltage drop will typically vary with temperature two millivolts per degree centigrade. At this rate over a 100 degree centigrade operating range, a 200 millivolt variation would occur in a diode forward voltage drop which would be unacceptable when attempting to split a 300 millivolt video signal into four equal 75 millivolt windows in a circuit employing silicon devices. Some form of compensation for the temperature dependent forward voltage drop of a silicon diode must be utilized.

To cancel out the effects of temperature dependent DC bias introduced by the silicon diode forward voltage drop, many radio frequency amplifiers employ balanced amplifiers at each stage of amplification in order to prevent DC bias levels from drifting with temperature. While balanced amplifiers can be used to overcome the temperature dependent characteristics of silicon devices, a trade off is made in that circuits become much more complex due to the increased number of components.

It would be desirable to have a technique to overcome the undesirable effects of temperature variation on a forward voltage drop of silicon diodes that would not necessitate the use of balanced amplifiers at each stage of amplification.

SUMMARY OF THE INVENTION

In accordance with the present invention, the receiver of a radio frequency modem achieves temperature and component independence in two steps. The receiver accomplishes detection in unbalanced parallel paths such that the diode drops of transistor base-to-emitter junctions in each path offsets those in the other path whereby temperature dependence of components does not adversely affect the operation of the receiver. Any residual base-to-emitter junction offset causes floating of the quiescent bias of the circuits. The floating is further removed by using the same ladder network to derive all references, automatic gain control as well as slicing levels, referenced to the filtered signal which is the DC signal left including any drift or floating. This minimizes the number of circuit components as compared, for example, to using balanced amplifiers.

Detectors employed in the two unbalanced paths utilize two stages of detection rather than a single stage of detection so as to minimize distortion.

The circuits within the modem disclosed herein accomplish the above by developing a floating automatic gain control (AGC) which not only maintains a constant peak envelope level but also precisely defines the data slicing levels relative to the peak envelope level. The term "floating" indicates that the quiescent bias of the circuits are allowed to vary with both temperature and component tolerances but the AGC reference level and also the data slicing levels are allowed to vary in an equivalent manner so that no difference or errors result.

BRIEF DESCRIPTION OF THE DRAWING

FIGS. 3A and 3B show respectively, in block diagram form, a radio frequency transmitter and receiver in which the present invention may be employed.

DESCRIPTION OF THE PREFERRED EMBODIMENT

Figure 3B:
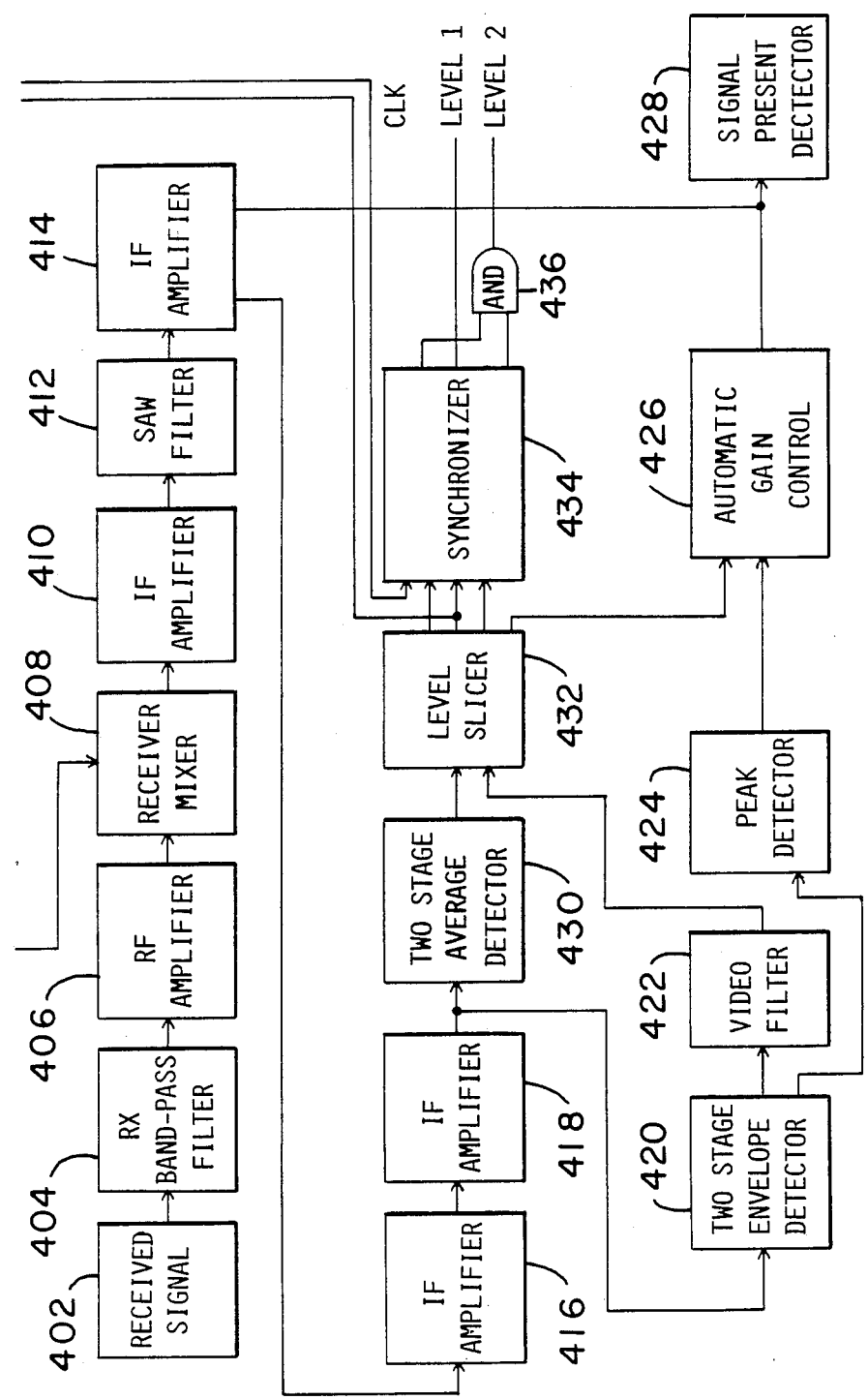

With reference to FIG. 3B, the receiver is shown in block diagram form. The received signal from the transmission medium 402 is passed through a band-pass filter 404 that limits the bandwidth of the signal the receiver will process. The band-pass filter output is amplified in radio frequency amplifier 406 which introduces some gain at radio frequency so as to distribute the gain between radio frequency and intermediate frequency as well as compensate for the loss in mixer 408.

Mixer 408 takes the amplified radio frequency receiver signal and mixes it with the oscillator signal, represented by the channel on which oscillator 230 is operating, resulting in the sum and difference of the two signals. The resultant signals are passed to another stage of intermediate frequency amplification 410 thence to a SAW filter 412. SAW filter 412 is a precision band-pass filter that passes only the difference signals. The SAW filter 412 output is passed to another stage of intermediate frequency amplification 414. Intermediate frequency amplifier 414 is a variable gain stage that receives a control signal from automatic gain control amplifier 426 to maintain the gain for automatic gain control. The output of gain-control amplifier 414 is passed to two more stages of intermediate frequency amplification, 416 and 418.

The output of amplifier 418 splits and takes two unbalanced signal processing paths. The first path is through two-stage envelope detector 420. The output of two-stage envelope detector 420 is provided to video filter 422 and peak detector 424. The video filter 422 output is one of two inputs to level slicer 432. The output of peak detector 424 is one of two inputs to automatic gain control circuit 426. The automatic gain control circuit compares a voltage reference received from level slicer 428 to the peak video signal received from peak detector 424 and provides a gain-control signal to variable gain intermediate frequency amplifier 414.

The automatic gain control amplifier 426 output also provides the input to signal-present detector 428 which determines whether there is a radio frequency signal being received and processed or whether what is being processed is noise.

The second path taken by the output of amplifier 418 passes through two-stage average detector 430, the output of which is the second input to level slicer 432. Level slicer 432 provides a reference voltage for automatic gain control circuit 426 as well as data levels to synchronizer 434. Some preliminary decoding is accomplished at the output of synchronizer 434 by AND gate 436 yielding binary signals LEVEL 0 and LEVEL 1 which are further decoded into binary data, such as by a broadband interface controller, not shown, manufactured by Motorola Incorporated, sold under Motorola Part No. MC68164 and described in the Motorola specification sheet aforesaid part number, said specification is hereby incorporated by reference.

Figure 1A:
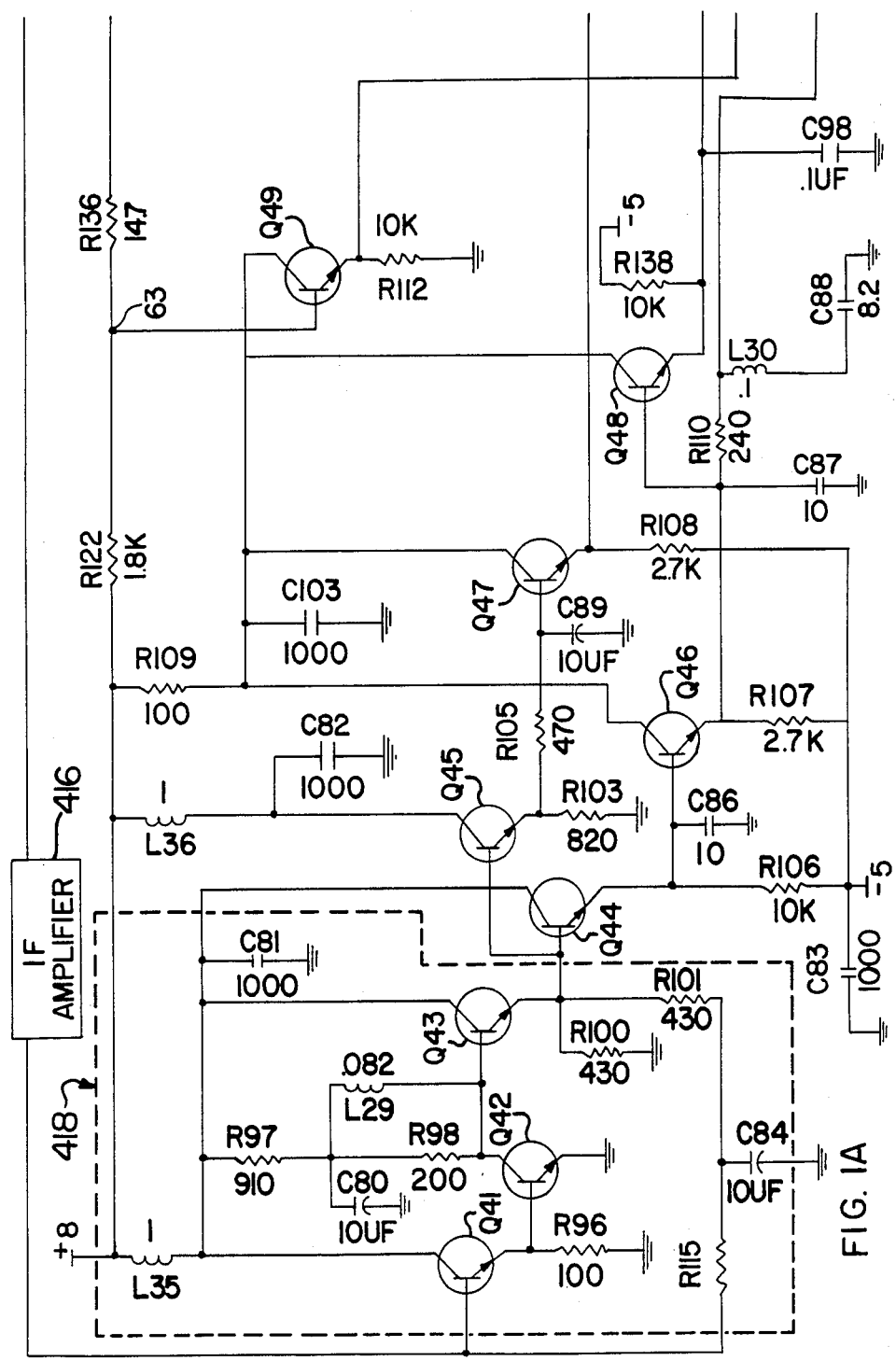
FIGS. 1A and 1B are a schematic diagram of a radio frequency receiver in accordance with the present invention.
Figure 1B:
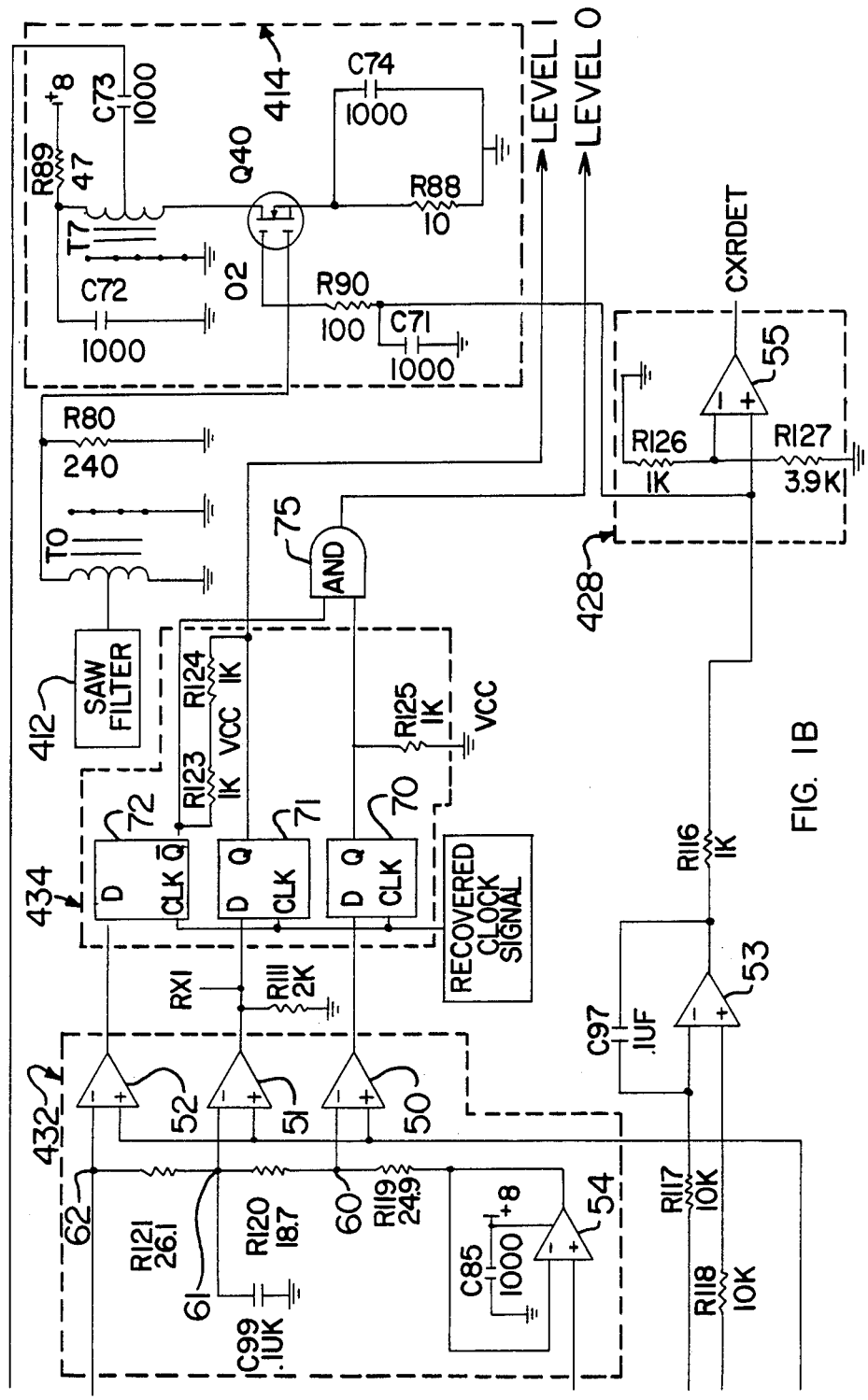

Intermediate frequency amplifier 418 and the subsequent signal processing circuits are shown in more detail in FIG. 1. The output of the previous intermediate frequency stage of amplification 416 is received at the base of transistor Q41. The base of transistor Q41 is at a potential of two diode drops above ground due to the emitter of transistor Q42 being grounded and the series transistor base-to-emitter voltage drops for transistors Q41 and Q42.

Transistors Q41, Q42 and Q43 comprise an intermediate frequency amplifier providing high input impedance at the base of transistor Q41, low output impedance at the emitter of transistor Q43 and a voltage gain provided by transistor Q42. The low output impedance at the emitter of transistor Q43 is desirable for the peak detectors that follow. Since two diode drops will be subtracted in the unbalanced signal paths that follow, it is convenient to maintain the quiescent level at the emitter of transistor Q43, as shown in FIG. 1, two diode drops above ground.

The base of transistor Q44 is maintained essentially at a potential two diode drops above ground as transistors Q41, Q42 and Q43 are all direct coupled with large negative feedback, the emitter of transistor Q42 is grounded, and resistors R101 and R115 are quite low in resistance value compared to the base current required at transistor Q41.

The signal received at the base of transistors Q44 and Q45 contains both a carrier signal and a video signal in the form of amplitude modulation on the carrier which are to be decoded by the receiver. It is desired that the input to transistors Q44 and Q45 be biased up two base-emitter junctions and this is conveniently achieved in the preceding amplifier by transistors Q41 and Q42. The first unbalanced path, the signal path, starts at the base of transistor Q44. The signal path goes through transistors Q44 and Q46 then splits again with the video signal passing through a video filter comprising resistor R110 capacitors C87 and C88 and inductor L30 thence passing to level slicing comparators 50, 51 and 52 which comprise level slicer 432. The automatic gain control path from the signal splitting at the output of transistor Q46 passes through transistor Q48, a transistor detector that detects the peak of the video envelope and provides that peak as one of the inputs to automatic gain control amplifier 53.

Since the base of transistor Q44 is two diode drops above ground, by the video signal passing through transistors Q44 and Q46, the video potential at the emitter of transistor Q46 is again essentially at ground potential.

Transistor Q44 with resistor R106 and capacitor C86, and transistor Q46 with R107 and the capacitance of the video filter form a peak detector alternatively known as an envelope detector. The R-C time constant is long compared to the period of the radio frequency signal but is short compared to the period of the video signal (data rate). The bias level is low for good linearity at minimum envelope values. The output at the emitter of transistor Q46 follows the upper half of the envelope. The DC voltage level at the emitter of Q44 is one diode drop above ground potential.

The output of transistor Q46 provides both the input to transistor Q48 and the input to the video filter. The DC voltage level at the emitter of transistor Q46 is essentially at ground potential. Thus, the base-to-emitter voltage drops of transistors Q44 and Q46 have removed in the first unbalanced path the DC bias introduced by transistors Q41 and Q42.

Transistor Q46 performs the same function as transistor Q44 and in conjunction therewith yields a two-stage cascaded envelope detection that is more linear and exhibits less group delay than can be accomplished with one transistor. The two stages of envelope detection reduces the amount of carrier that feeds through and provides a lower output impedance than could be achieved in a single stage.

The video envelope detected by transistor Q46 provides the input to transistor Q48. Transistor Q48, resistor R138 and capacitor C98 comprise a peak detector or envelope detector. The R-C time constant is long compared to the video period (data rate) so that the output of transistor Q48 detects and follows the peak of the video envelope and provides that peak to the negative input of automatic gain control amplifier 53. Without automatic gain control, the peak of the video envelope at the base of transistor Q48 would vary as the received signal amplitude varied. With automatic gain control, the peak of the video envelope will track the output of the transistor Q49. Transistor Q48 introduces one diode drop below the output of transistor Q46, which is essentially at ground potential.

The second unbalanced path, used to derive the level slicer and automatic gain control reference voltages, also begins at the base of transistor Q44 thence passes through transistors Q45 and Q47. The output from transistor Q47 provides the input to buffer amplifier 54 which drives a ladder network comprised of resistors R119, R120, R121, R122 and R136. The automatic gain control reference voltage is tapped off of the ladder network, passes through transistor Q49 to introduce a base-to-emitter voltage drop and provided as the second input to automatic gain control amplifier 53. Since the base of transistor Q44 is two diode drops above ground, the base of transistor Q45 is also two base-to-emitter junction voltages above ground. The output of transistor Q45 is DC coupled to the base of transistor Q47 through resistor R105. By the reference signal passing through the base-to-emitter junction of transistor Q45 then transistor Q47, the two diode drops above ground potential present at the base of transistor Q45 are removed.

The transistor Q45 output develops a reference voltage for level slicing and automatic gain control. Transistor Q45, resistors R103 and R105 and capacitors C89 form a unity gain emitter follower amplifier incorporating one diode DC offset followed by a low pass filter which passes only DC. All of the video and radio frequency carrier is filtered off so that the remaining DC level at the base of transistor Q47 tracks the level at the emitter of transistor Q44.

Transistor Q47 and resistor R108 form a unity gain amplifier incorporating one diode of DC offset so that the DC level at the emitter of transistor Q47 tracks essentially ground potential, independent of temperature variations of the components. The base-to-emitter voltage drops of transistors Q45 and Q47 have removed in the second unbalanced path the DC bias introduced by transistors Q41 and Q42.

The emitter of transistor Q47, as stated above, is essentially at ground potential with the signal thereon independent of temperature variations, provides the input to amplifier 54. Amplifier 54 is a unity gain DC amplifier with no offset which has a high input impedance so not to load transistor Q47 and provides a low impedance source to drive a resistor ladder network comprised of resistors R119, R120, R121, R122 and R136. Since the output of amplifier 54 is at ground potential, and the resistor ladder network is connected between the supply voltage and the output of amplifier 54, all of the voltages at the resistor junction divided voltage points will be a fixed percentage of the supply voltage, independent of temperature. Because of the manner in which the automatic gain control voltage is developed, these voltages will also be a fixed percentage of the video signal.

Since the voltage at the output of amplifier 54 is essentially ground, and the resistor ladder network is tied between the supply voltage and the output of amplifier 54, the current through the ladder network is substantially constant and dependent only on the voltage difference between the supply and the output of amplifier 54. The supply voltage will, at worst, drift five percent. The voltage at the output of amplifier 54 will drift a few millivolts, plus or minus, with temperature but not more than that due to the manner in which the diode drops are cancelled. The current through the resistor network is essentially constant and any variations in that current will track the temperature variations at the input. Since the output will track the input and the total current through the resistor ladder network is constant, the voltage at each tap point 60, 61, 62 and 63 will essentially track the output of amplifier 54 with temperature, and be a predetermined voltage thereabove.

The output of amplifier 54 is a floating reference. The video slicing levels developed on the resistor ladder network will float a small amount with temperature but they float with the automatic gain control reference since they are developed on the same ladder network. Since resistors R119, R120, R121 and R136 are small relative to the resistance of resistor R122, the voltage divider ratio is such that any floating that does occur at the output of amplifier 54 will be desensitized by the voltage divider ratio which is approximately 20-to-1.

The voltage in the ladder network at divided voltage point 60 between resistors R119 and R120 provides the reference voltage for data slicing level comparator 50 which produces a "2-0" data symbol. The voltage at divided voltage point 60, in the preferred embodiment, is greater than the voltage at the output of amplifier 54.

The voltage in the ladder network at divided voltage point 61 between resistors R120 and R121 provides the reference voltage for data slicing level comparator 51 which produces a "2-4" data symbol. The voltage at divided voltage point 61, in the preferred embodiment, is greater than the voltage at divided voltage point 60.

The voltage in the ladder network at divided voltage point 62 between resistors R121 and R136 provides the voltage reference for data slicing level comparator 52 which produces a "4" data symbol. The voltage at divided voltage point 62, in the preferred embodiment, is greater than the voltage at divided voltage point 61.

The voltage in the ladder network at divided voltage point 63 between resistors R136 and R122 provides the reference voltage for automatic gain control. The voltage at divided voltage point 63, in the preferred embodiment, is greater than the voltage at divided voltage point 62. The automatic gain control reference from divided voltage point 63 on the ladder network is buffered by transistor Q49 to introduce a diode drop and temperature dependent characteristics, corresponding to a diode drop and temperature dependent characteristics introduced by transistor Q48 in the automatic gain control signal path, and provide the final DC voltage reference as the second input to automatic gain control amplifier 53.

Automatic gain control amplifier 53 receives a floating reference voltage from the ladder network at voltage divider point 63 as buffered by transistor Q49 and the peak video envelope from the peak detecting output circuit of transistor Q48. The signal path for automatic gain control is through transistors Q44, Q46 and Q48 to one input of amplifier 53. The base of transistor Q44 was biased to be two diode drops above ground, thus presenting a signal representing the peak video envelope to amplifier 53 that is essentially one diode drop below ground.

The bias level for the reference voltage for automatic gain control is through transistors Q45, Q47 and Q49 to the other input of amplifier 53. The base of transistor Q45 was biased to be two diode drops above ground, thus presenting a voltage reference signal to amplifier 53 that is essentially one diode drop below ground.

In both signal paths from the output of the last stage of intermediate frequency amplification, the number of transistors in the two unbalanced signal paths are identical in number. The diode drops introduced by the base-to-emitter junctions as well as temperature variations tend to cancel through the two unbalanced paths since, although not identical, the paths are the same in terms of transistor count. This is important because the base-to-emitter junction is the primary contributor to the variation in DC bias due to a change in temperature.

Automatic gain control amplifier 53 is the automatic gain control amplifier and loop filter. Amplifier 53 has a very high DC gain; in the preferred embodiment amplifier 53 has no DC feedback. The high gain is important to prevent the video level from changing. The inputs to automatic gain control amplifier 53 are from transistors Q48 and Q49 as discussed above. The output is a control signal provided to a variable gain amplifier to prevent the video level from changing. Any small difference between the inputs to amplifier 53 will be amplified by the very large gain thereof and applied to amplifier 414 in an earlier stage of amplification within the receiver. The gain of amplifier 414 will vary in order to essentially eliminate any difference between the outputs of transistors Q48 and Q49, which are the inputs to amplifier 53.

In a preferred embodiment, transistor Q40 is an insulated gate field effect transistor having a several volt control range and configured as a variable gain amplifier for automatic gain control. The control signal output from automatic gain control amplifier 53 is a voltage control signal that is input to transistor Q40 on pin 2. Transistor Q40 does not introduce a large gain but does exhibit a large gain-control range. Transistor Q40 has a very high input impedance that is independent of gain to prevent mismatching of the SAW filter at differing gains.

The output of automatic gain control amplifier 53 also provides one input to signal-present comparator 55. The other input to signal-present comparator 55, representing a threshold, is a fixed voltage as may be derived from a divided voltage point of a voltage dividing network tied between supply and ground. Depending on the voltage output by automatic gain control amplifier 53, signal-present comparator 55 indicates whether or not the receiver is receiving a radio frequency signal. Without any RF signal at the input to the receiver, the automatic gain control loop tends to increase the gain of the receiver by increasing the voltage on the automatic gain control line input to transistor Q40. The DC control voltage increases until the automatic gain control loop is saturated which, in the preferred embodiment, is approximately six volts DC. When there is a nominal level of radio frequency signal received and amplified by the receiver the automatic gain control voltage decreases to approximately negative one volt. In this manner signal-present comparator 55 when detecting a voltage above a threshold slightly in excess of four volts indicates that a signal is not being received by the receiver and the output from signal-present comparator 55 may be used by the broadband interface controller to determine if the data being processed is valid, and when there is no valid data due to no signal being received the processed data may be knowingly disregarded.

Figure 2:
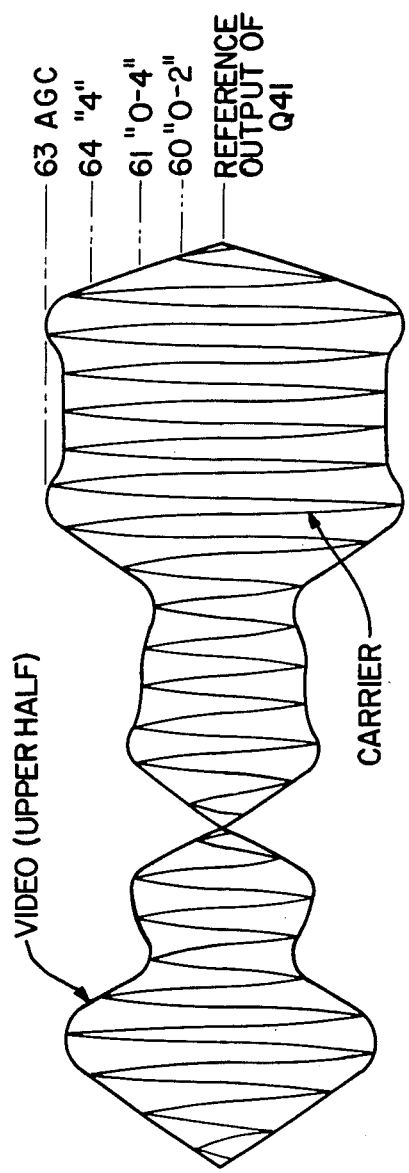
FIG. 2 shows the slicing and automatic gain control levels on a video signal.

With the slicing voltage levels established by the resistive ladder network comprised of resistors R119, R120, R121, R122 and R136, to level slicing comparators 50, 51 and 52 slice the filtered video signal as shown in FIG. 2. The filtered video signal prior to being sliced has jitter in both the amplitude and timing. The output of level slicing comparators 50, 51 and 52 provides signals free of amplitude jitter leaving timing jitter only. The signals from level slicing comparators 50, 51 and 52 are logic level, binary signals and are respectively passed to flip-flops 70, 71 and 72. The timing jitter is removed by applying the recovered clock signal with 90 degree phase shift so that the leading edge of the clock is in the middle of the eye pattern of the data, to clock the amplitude-jitter-free data through flip-flops 70, 71 and 72. The output from flip-flops 70, 71 and 72 is thus free of timing jitter as well as amplitude jitter. The output from flip-flop 70, 71 and 72 represent three symbols with some preliminary decoding taking place in that the output from flip-flop 72 is taken from the $\overline{Q}$ output and further the output of flip-flop 72 is combined with the output of flip-flop 70 in AND gate 75 to produce signal LEVEL 0. The output of flip-flop 71 is signal LEVEL 1. These two signals represent four combinations of binary data, 00, 01, 10 and 11 that are further decoded by the broadband interface controller.

Ideally, each of the transistors Q41, Q42, Q44, Q45, Q46, Q47, Q48 and Q49 would be manufactured on the same wafer so the transistors would have similar temperature dependent characteristics and in operation would be subjected to identical variations in ambient temperature to cancel the effects of temperature dependent base-to-emitter voltage drops in accordance with the present invention.

In applications where eight transistors are not available on a single chip, it would be desirable to have each of transistors Q41, Q42, Q44, Q45, Q46 and Q47 on single chip. In this manner, the transistors introducing the two diode voltage drop bias above ground, transistors Q41 and Q42, would be subject to the same temperature variations as the transistors that remove the two diode voltage drop in the signal path, transistors Q44 and Q46, as well as the transistors that remove the two diode voltage drop in the voltage reference path, transistors Q45 and Q47. In this manner the effects of temperature dependence on the base-to-emitter voltage drops would cancel.

In applications where six transistors are not available on a single chip, the transistor pairs Q44 and Q45, Q46 and Q47 as well as Q48 and Q49 or the group of transistors Q44, Q45, Q46 and Q47 should be on a single chip where possible.

Of course, when using integrated circuits instead of discrete transistors, other combinations of transistors, beyond those listed above, being on the same chip will provide advantageous cancellation of temperature effects on base-to-emitter voltage and these combinations are intended to be within the scope of the invention.

I claim:
1. A radio frequency receiver comprising:
 a first signal processing means for detecting and tracking the video envelope of an amplified received signal;
 level slicing means for receiving said video envelope from said first signal processing means, for receiving a level slicing voltage reference level and for providing an output when the video envelope exceeds said level slicing voltage reference level;
 peak detecting means for receiving said video envelope from said first signal processing means and for detecting the peak of said video envelope;
 a second signal processing means for detecting and tracking the average value of a received signal;
 voltage divider means for receiving the average value of said received signal from said second signal processing means and for establishing a level slicing voltage reference, said voltage divider means tied between a supply voltage and said average value of said reference voltage for said level slicing means;
 means for generating a comparator reference voltage;

gain-control comparator means for receiving said peak of the video envelope from said peak detector, for receiving said comparator reference voltage from said comparator reference voltage generating means, for comparing said peak of video envelope to the comparator reference voltage generated by said comparator reference voltage generating means and for producing an output signal representative of the difference therebetween;

variable gain amplifier means for amplifying said received signal thereby producing said amplified received signal, the gain of said variable gain amplifier means controlled by said comparator means output signal to maintain the amplitude of said amplified received signal constant.

2. A radio frequency receiver as recited in claim 1 wherein said first signal processing means comprises a two-stage peak detector.

3. A radio frequency receiver as recited in claim 1 wherein said second signal processing means comprises a two stage average detector.

4. A radio frequency receiver as recited in claim 1 further comprising a video filter for receiving said video envelope from said first signal processing means and for filtering said video envelope to remove residual RF, said video filter providing a filtered video signal to said level slicing means.

5. A radio frequency receiver as recited in claim 1 further comprising a signal-present comparator for receiving the output signal from the gain-control comparator means, for comparing the gain-control comparator output signal to a predetermined threshold and for providing an output representative of whether the gain-control comparator output exceeds the predetermined threshold.

6. A radio frequency receiver as recited in claim 1 further comprising synchronizing means for synchronizing the sliced level output with a clock signal.

7. A radio frequency receiver as recited in claim 6 wherein the level slicing means is comprised of a plurality level slicers for providing a plurality of sliced level outputs, and further comprising decoding means for decoding the sliced level signals.

8. A radio frequency receiver, comprising:
a first two-stage signal processing means for detecting and tracking the video envelope of an amplified received signal;
peak detecting means for detecting the peak of said video envelope produced by said first two-stage signal processing means and for producing a signal representative thereof;
level slicing means for receiving said video envelope, for receiving a plurality of voltage reference levels and for providing a plurality of sliced level outputs;
a second two-stage signal processing means for detecting and tracking the average value of said amplified received signal;
a voltage divider means for establishing a plurality of reference voltages, said voltage divider means tied between a supply voltage and said average value of said amplified received signal, said voltage divider means establishing a plurality of level slicing voltage reference levels, said voltage divider means also establishing a gain-control voltage reference;
gain-control comparator means for receiving said peak of the video envelope from said peak detecting means, for receiving said gain-control voltage reference from said voltage divider means, and for comparing said peak of the video envelope to said gain-control reference voltage and for producing an output signal representative of the difference therebetween; and variable gain amplifier means for receiving the output signal from said comparator means and for amplifying the radio frequency signal received by said receiver thereby producing said amplified received signal, the gain of said variable gain amplifier means controlled by said comparator means output signal to maintain said peak amplitude of the amplified received signal constant.

9. A radio frequency receiver as recited in claim 8 further comprising a signal-present comparator for receiving the output signal from the gain-control comparator means, for comparing the gain-control comparator output signal to a predetermined threshold and for providing an output representative of whether the gain-control comparator output exceeds the predetermined threshold.

10. A radio frequency receiver as recited in claim 8 wherein each of said first and second two-stage signal processing means comprises a transistor having a base-to-emitter voltage drop.

11. A radio frequency receiver as recited in claim 10 wherein the number of base-to-emitter voltage drops in the first two-stage signal processing means is the same as the number of base-to-emitter voltage drops in the second two-stage signal processing means.

12. A radio frequency receiver as recited in claim 10 wherein the number of base-to-emitter voltage drops in the peak video envelope signal path between said first two-stage signal processing means and gain-control comparator means is the same as the number of base-to-emitter voltage drops in said voltage reference of gain-control signal path between said second two-stage signal processing means and said gain-control comparator means.

13. A radio frequency receiver as recited in claim 12 further comprising an intermediate frequency amplifier, said intermediate frequency amplifier having a transistor amplification stage, said intermediate frequency amplifier interposed between said variable gain amplifier means, said intermediate frequency amplifier introducing into the quiescent level of the amplified received signal a base-to-emitter voltage bias, whereby the base-to-emitter voltage bias introduced by the intermediate frequency amplifier is offset by a base-to-emitter voltage drop in the first two-stage signal processing means in the peak video envelope detecting signal path and the base-to-emitter voltage bias introduced by the intermediate frequency amplifier is offset by a base-to-emitter voltage drop in the second two-stage signal processing means in the gain-control voltage reference path.

14. A radio frequency receiver as recited in claim 13 wherein each of the transistors that introduce a bias voltage into the quiescent level of said amplified received signal in said intermediate frequency amplifier and each of the transistors in said peak video envelope signal path between said first two-stage signal processing means and said gain-control comparator means as well as each of the transistors in said voltage reference for gain-control signal path are on the same chip, whereby the transistors all have the same temperature dependent characteristics and are subjected to the same temperature variations.

15. A radio frequency receiver as recited in claim 13 wherein each of the transistors that introduce a bias voltage into the quiescent level of said amplified received signal in said intermediate frequency amplifier and each of said transistors that introduce a base-to-emitter voltage drop in said peak video signal path in said first two-stage signal processing means and each of the transistors that introduce a base-to-emitter voltage drop in said voltage reference for gain-control in said second two-stage signal processing means are on the same chip, whereby the transistors all have the same temperature dependent characteristics and are subjected to the same temperature variations.

16. A radio frequency receiver as recited in claim 13 wherein each transistor that introduces a base-to-emitter drop in said first and second signal processing means is on the same chip.

17. A radio frequency receiver as recited in claim 13 wherein the transistors comprising the first stage of said first two-stage signal processing means and the first stage of said second two-stage signal processing means are on the same chip.

18. A radio frequency receiver as recited in claim 13 wherein the transistors comprising the second stage of said first two-stage signal processing means and the second stage of said second two-stage signal processing means are on the same chip.

* * * * *